United States Patent
Yoshioka et al.

(10) Patent No.: US 7,201,053 B2
(45) Date of Patent: Apr. 10, 2007

(54) CAPACITANCE TYPE PHYSICAL QUANTITY SENSOR

(75) Inventors: Tetsuo Yoshioka, Okazaki (JP); Akihiko Teshigahara, Nisshin (JP); Junji Ohara, Nisshin (JP); Yukihiro Takeuchi, Nishikamo-gun (JP); Toshimasa Yamamoto, Bisai (JP); Kazuhiko Kano, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/834,183

(22) Filed: Apr. 29, 2004

(65) Prior Publication Data

US 2004/0231421 A1 Nov. 25, 2004

(30) Foreign Application Priority Data

May 22, 2003 (JP) ............................. 2003-145284

(51) Int. Cl.
*G01P 15/125* (2006.01)
*G01P 9/04* (2006.01)

(52) U.S. Cl. .............................. 73/514.32; 73/504.12; 73/504.14

(58) Field of Classification Search ............. 73/514.32, 73/514.29, 504, 4, 504.12, 504.14, 504.15
See application file for complete search history.

(56) References Cited

U.S. PATENT DOCUMENTS 5,350,189 A * 9/1994 Tsuchitani et al. .......... 280/735
5,456,111 A * 10/1995 Hulsing, II ............... 73/514.32
5,821,420 A * 10/1998 Cho et al. ................. 73/504.16
6,041,653 A * 3/2000 Ichikawa et al. ......... 73/514.32
6,151,966 A   11/2000 Sakai et al.
6,494,096 B2 * 12/2002 Sakai et al. .............. 73/514.32

FOREIGN PATENT DOCUMENTS

| JP | A-2000-022171 | 1/2000 |
| JP | A-2000-266777 | 9/2000 |
| JP | A-2002-176182 | 6/2002 |

* cited by examiner

*Primary Examiner*—Helen Kwok
(74) *Attorney, Agent, or Firm*—Posz Law Group, PLC

(57) ABSTRACT

A capacitance type physical quantity sensor detects physical quantity. The sensor includes a movable portion including a movable electrode and a fixed portion including a fixed electrode. The fixed electrode includes a detection surface facing a detection surface of the movable electrode. The movable electrode is movable toward the fixed electrode in accordance with the physical quantity so that a distance between the detection surfaces is changeable. At least one of the movable and the fixed electrodes includes a groove. The groove is disposed on a top or a bottom of the one of the movable and the fixed electrodes, has a predetermined depth from the top or the bottom, and extends from the detection surface to an opposite surface.

21 Claims, 7 Drawing Sheets

CAPACITANCE TYPE PHYSICAL QUANTITY SENSOR

CROSS REFERENCE TO RELATED APPLICATION

This application is based on Japanese Patent Application No. 2003-145284 filed on May 22, 2003, the disclosure of which is incorporated herein by reference.

FIELD OF THE INVENTION

The present invention relates to a capacitance type physical quantity sensor for detecting physical quantity such as acceleration, yaw rate, angular velocity or the like.

BACKGROUND OF THE INVENTION

A capacitance type physical quantity sensor for detecting physical quantity is disclosed, for example, in Japanese Patent Application Publication No. H11-326365 (i.e., U.S. Pat. No. 6,151,966). The sensor includes a movable electrode having multiple comb-tooth electrodes and a fixed electrode having multiple comb-tooth electrodes. The sensor further includes a movable portion having a massive portion and the movable electrode integrally formed with the massive portion. When the physical quantity is applied to the sensor, the movable portion is displaced in accordance with the physical quantity. At that time, a displacement direction of the movable portion is perpendicular to a detection surface of each of the movable electrode and the fixed electrode. The detection surface of the movable electrode faces the detection surface of the fixed electrode so that a capacitor having a capacitance is formed between them. As a distance between the detection surfaces becomes shorter, the capacitance of the capacitor becomes larger, and as the distance between the detection surfaces becomes longer, the capacitance becomes smaller. Accordingly, the physical quantity is detected on the basis of a capacitance change caused by a distance change.

However, in the above physical quantity sensor, when the movable portion (i.e., the movable electrode) is displaced, damping effect works in a squeezing direction (i.e., the displacement direction of the movable portion) between the detection surfaces of the movable and the fixed electrodes because of viscosity of fluid (i.e., gas, liquid or the like) disposed between the detection surfaces. Accordingly, the displacement of the movable electrode becomes small because of the damping effect, so that the capacitance change of the capacitor also becomes small in accordance with the displacement of the movable electrode. Therefore, sensitivity of the sensor is reduced. Specifically, as the distance between the detection surfaces is shorter, the damping effect much affects the displacement of the movable electrode, i.e., the displacement is much reduced. Therefore, in this case, the sensor cannot detect fine physical quantity.

SUMMARY OF THE INVENTION

In view of the above-described problem, it is an object of the present invention to provide a capacitance type physical quantity sensor having high sensitivity.

A capacitance type physical quantity sensor detects physical quantity. The sensor includes a movable portion including a movable electrode and a fixed portion including a fixed electrode. The movable electrode includes a detection surface. The fixed electrode includes a detection surface facing the detection surface of the movable electrode. The movable electrode is movable toward the fixed electrode in accordance with the physical quantity applied to the sensor so that a distance between the detection surfaces of the movable and the fixed electrodes is changeable. At least one of the movable and the fixed electrodes includes a groove. The groove is disposed on a top or a bottom of the one of the movable and the fixed electrodes, has a predetermined depth from the top or the bottom, and extends from the detection surface to an opposite surface opposite to the detection surface of the one of the movable and the fixed electrodes.

In the above sensor, the damping effect is substantially prevented from affecting because of the groove so that an electrostatic capacitance change becomes larger compared with a conventional sensor. Therefore, the sensor can detect a fine acceleration, i.e., the sensor has high sensitivity. Thus, the sensor has a small damping effect.

Preferably, the sensor further includes a substrate. The movable portion further includes a spring and a massive portion. The fixed portion further includes an anchor. The movable portion is supported on a substrate through the spring. The massive portion together with the movable electrode is displaceable in accordance with the physical quantity applied to the sensor. The movable electrode is integrally disposed on a side of the massive portion to extend from the massive portion. The fixed electrode extends from the anchor so that the fixed electrode is supported on the substrate through the anchor. The sensor detects the physical quantity on the basis of a change of a capacitance provided by a capacitor between the detection surfaces of the movable and the fixed electrodes, the change of the capacitance caused by a displacement of the movable electrode in accordance with the physical quantity applied to the massive portion. More preferably, the groove is disposed from the top to the bottom of the fixed electrode so that the fixed electrode is divided into a plurality of parts. Each part of the fixed electrode is insulated from the substrate, connects each other through a wiring disposed on the substrate, and supported on the substrate through the wiring.

Preferably, the groove works as a flow path for flowing a fluid disposed between the movable and the fixed portions in a case where the movable portion moves toward or against the fixed electrode.

Preferably, the movable portion is displaceable in a direction perpendicular to the detection surfaces of the movable and the fixed electrodes.

Preferably, the movable portion has a displaceable direction, in which the movable portion is displaceable. The groove has a penetration direction, in which the groove penetrates the one of the movable and the fixed electrodes. The displaceable direction is parallel to the penetration direction.

Preferably, the movable portion has a displaceable direction, in which the movable portion is displaceable. The groove is disposed on both of the movable and the fixed electrodes. The groove on the movable electrode is not arranged in line with the groove on the fixed electrode in the displaceable direction.

Further, another capacitance type physical quantity sensor includes a movable portion including a movable electrode and a fixed portion including a fixed electrode. The movable electrode includes a detection surface. The fixed electrode includes a detection surface facing the detection surface of the movable electrode. The movable electrode is movable toward the fixed electrode in accordance with the physical quantity applied to the sensor so that a distance between the detection surfaces of the movable and the fixed electrodes is changeable. At least one of the movable and the fixed electrodes includes a thin portion. The thin portion extends from the detection surface to an opposite surface opposite to the detection surface of the one of the movable and the fixed electrodes.

In the above sensor, the damping effect is substantially prevented from affecting because of the thin portion so that an electro-static capacitance change becomes larger compared with a conventional sensor. Therefore, the sensor can detect a fine acceleration, i.e., the sensor has high sensitivity. Thus, the sensor has a small damping effect.

Preferably, the thin portion works as a flow path for flowing a fluid disposed between the movable and the fixed portions in a case where the movable portion moves toward or against the fixed electrode.

Preferably, the movable portion has a displaceable direction, in which the movable portion is displaceable. The thin portion has an extending direction, in which the thin portion extends on the one of the movable and the fixed electrodes. The displaceable direction is parallel to the extending direction.

Preferably, the movable portion has a displaceable direction, in which the movable portion is displaceable. The thin portion is disposed on both of the movable and the fixed electrodes. The thin portion on the movable electrode is not arranged in line with the thin portion on the fixed electrode in the displaceable direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1A:
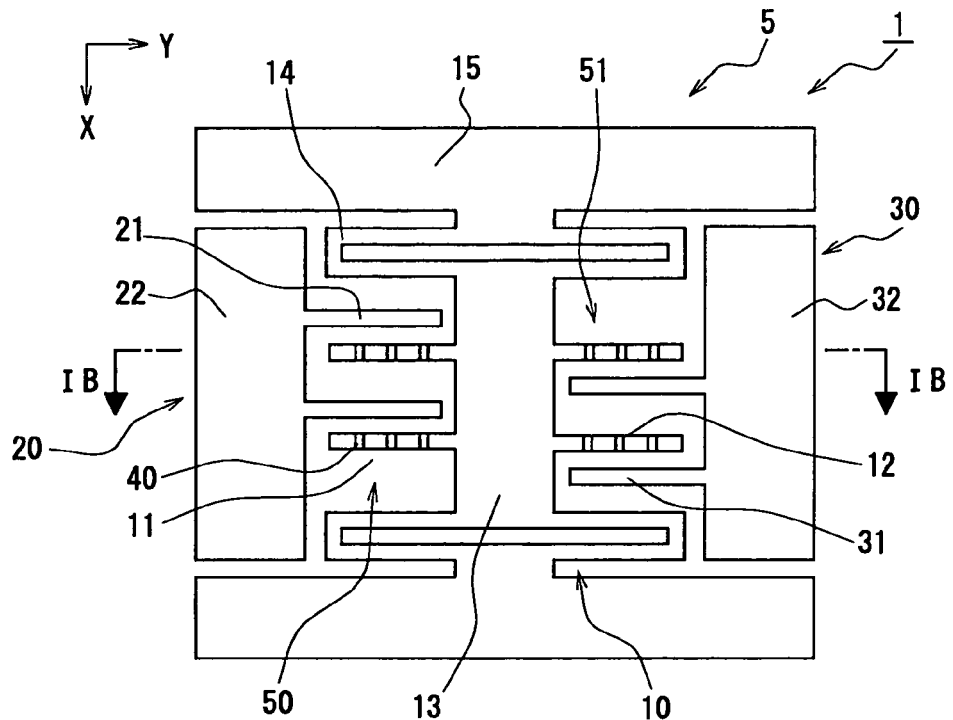
FIG. 1A is a plan view showing a capacitance type acceleration sensor according to a first embodiment of the present invention.
Figure 1B:
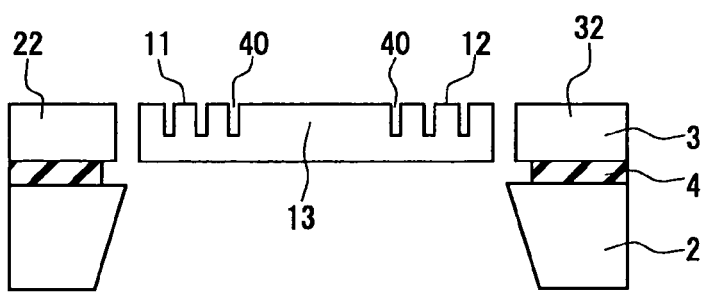
FIG. 1B is a cross sectional view showing the sensor taken along line IB—IB in FIG. 1A.
Figure 1C:
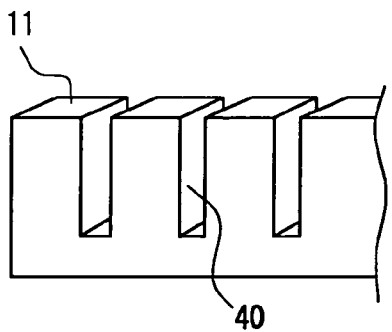
FIG. 1C is a partially enlarged perspective view showing a movable electrode of the sensor according to the first embodiment.

A capacitance type physical quantity sensor 1 according to a first embodiment of the present invention is shown in FIGS. 1A–1C. The sensor 1 is, for example, a capacitance type acceleration sensor 1. A damping effect working between a movable portion 10 and a fixed portion 20 is reduced in the sensor 1.

The capacitance type acceleration sensor 1 is formed of a SOI (i.e., silicon on insulator) substrate. The SOI substrate includes the first semiconductor layer 2, the second semiconductor layer 3, and an insulation layer 4. The insulation layer 4 as a sacrifice layer is made of, for example, silicon oxides, and disposed between the first and second semiconductor layers 2, 3. A sensing portion 5 is formed in the SOI substrate by using a well-known micro machining technique, which is provided by a conventional semiconductor manufacturing techniques. Thus, the sensor 1 is manufactured.

As shown in FIG. 1A, the sensing portion 5 includes a movable portion 10 formed in the second semiconductor layer 3 and a pair of fixed portions 20, 30 formed in the second semiconductor layer 3. A predetermined distance is provided between the movable portion 10 and each fixed portion 20, 30, respectively, so that the movable portion 10 is insulated from the fixed portions 20, 30.

The movable portion 10 includes a pair of movable electrodes 11, 12, a massive portion 13 and a pair of spring portions 14. The movable electrodes 11, 12 are disposed on both sides of the massive portion 13, and extend in a direction perpendicular to a longitudinal direction of the massive portion 13 (i.e., the Y direction in FIG. 1A). The movable electrodes 11, 12 are integrally formed with the massive portion 13, and each movable electrode 11, 12 has multiple electrode teeth (i.e., multiple comb-tooth electrodes) disposed on one side of the massive portion 13. In FIG. 1A, the movable electrode 11, 12 has two electrode teeth. The massive portion 13 works as a massive weight for being applied with acceleration. Each movable electrode 11, 12 includes a groove 40, which is disposed on a top of the second semiconductor layer 3. The groove 40 has a predetermined depth from the top of the movable electrode 11, 12. The groove 40 penetrates the movable electrode 11, 12 in a horizontal direction of the second semiconductor layer 3, which is perpendicular to the comb-tooth electrode of the movable electrode 11, 12 (i.e., the X direction in FIG. 1A). Specifically, the groove 40 penetrates (i.e., extends) from a detection surface of the movable electrode 11, 12 facing a detection surface of a fixed electrode 21 to an opposite surface opposite to the detection surface of the movable electrode 11, 12. Here, the opposite surface of the movable electrode 11, 12 is a non-detection surface. In the first embodiment, three grooves 40 are formed on one comb-tooth electrode of the movable electrode 11, 12. However, multiple grooves 40 can be formed on one comb-tooth electrode of the movable electrode 11, 12.

The spring portion 14 is disposed on both sides of the massive portion 13, and connects the massive portion 13 and the first anchor 15 for supporting the movable portion 10. The first anchor 15 works as a support disposed on the first semiconductor layer 2 through the insulation layer 4. The spring portion 14 has a rectangular frame with a through hole, which extends in a horizontal direction perpendicular to an acceleration direction (i.e., the Y direction). The acceleration is applied to the sensor 1 in the acceleration direction (i.e., the X direction) shown as an arrow in FIG. 1A. Therefore, the spring is displaced along with the acceleration direction (i.e., the X direction), when the movable portion 10 is applied with the acceleration including the component of the acceleration in the X direction in FIG. 1A. Specifically, when the movable portion 10 is applied with the acceleration, the massive portion 13 and the movable electrodes 11, 12 are displaced toward an opposite direction of the acceleration direction (i.e., a minus X direction). When the acceleration is disappeared, the massive portion 13 and the movable electrodes 11 12 return to a neutral position.

A part of the first semiconductor layer 2 and a part of the insulation layer 4, which are disposed under the movable electrodes 11, 12, the massive portion 13 and the spring portion 14, are selectively etched and removed so that each bottom of the movable electrodes 11, 12, the massive portion 13 and the spring portion 14 is exposed to the outside. That is, the bottom of a part of the second semiconductor layer 3 is exposed. The first anchor 15 includes a pad (not shown) for connecting the movable electrode 11, 12. The pad is disposed on a predetermined position of the first anchor 15, and connects to a C-V conversion circuit.

Each fixed portion 20, 30 includes a fixed electrode 21, 31 and the second anchor 22, 32, respectively. The fixed electrode 21, 31 extends from the second anchor 22, 32, and is parallel to the movable electrode 11, 12 extending from the massive portion 13. A predetermined distance (i.e., a detection clearance) is disposed between the movable electrode 11, 12 and the fixed electrode 21, 31. Here, the fixed electrode 21, 31 is cantilevered on the second anchor 22, 32. Specifically, parts of the first semiconductor layer 2 and the insulation layer 4 disposed under the fixed electrodes 21, 31 are selectively etched and removed so that the bottom of the fixed electrode 21, 31 (i.e., the bottom of the second semiconductor layer 3) is exposed to the outside.

The second anchor 22, 32 is disposed parallel to the massive portion 13, and fixed to the second semiconductor layer 2 through the insulation layer 4. The second anchor 22, 32 has a pad (not shown) for connecting the fixed electrode 21, 31. The pad is disposed on a predetermined position of the second anchor 22, 32, and connects to the C-V conversion circuit.

As shown in FIG. 1A, the fixed electrode 21, 31 has multiple comb-tooth electrodes, the number of which is equal to that of the movable electrode 11, 12. In this embodiment, the fixed electrode 21, 31 has two comb-tooth electrodes. The first sensing portion 50 is formed between the movable electrode 11 and the fixed electrode 21. The second sensing portion 51 is formed between the movable electrode 12 and the fixed electrode 31. Thus, each of the first and second sensing portions 50, 51 has two detection portions, respectively, so that two capacitor having a predetermined capacitance are provided. The two detection portions are provided by two comb-tooth electrodes of both of the fixed and movable electrodes 11, 12, 21, 31. However, the sensing portion 50, 51 can have multiple detection portions. In this case, each of the movable electrode 11, 12 and the fixed electrode 31, 32 has multiple comb-tooth electrodes.

In the capacitance type acceleration sensor 1, the first sensing portion 50 composed of the movable electrode 11 and the fixed electrode 21 has the first total electro-static capacitance CS1. The second sensing portion 51 composed of the movable electrode 12 and the fixed electrode 31 has the second total electro-static capacitance CS2. The movable electrodes 11, 12 and the fixed electrodes 21, 31 are arranged to become a difference $\Delta C$ of electro-static capacitance (i.e., $\Delta C=CS1-CS2$) to be substantially zero in a case where no acceleration is applied to the sensor 1. When the massive portion 13 is applied with the acceleration toward the X direction as the detection direction, the movable portion 10 is displaced toward the opposite direction of the acceleration direction, i.e., the minus X direction. Then, the first and second total electro-static capacitances CS1, CS2 are changed so that the difference $\Delta C$ of the electro-static capacitance between the first and second total electro-static capacitances CS1, CS2 is changed from zero. Accordingly, the C-V conversion circuit detects the difference $\Delta C$ of the electro-static capacitance as a voltage change, so that the applied acceleration is detected. Here, the acceleration can be detected by measuring one of the capacitance changes of the first sensing portion 50 or the second sensing portion 51.

The sensor 1 according to the first embodiment is manufactured as follows.

At first, a silicon oxide film (not shown) is formed on the surface of the second semiconductor layer 3. A contact hole for providing the electrode pads for the movable electrode and the fixed electrode is formed in the silicon oxide film. After the contact hole is formed, an aluminum film is deposited on the second semiconductor layer 3 through the silicon oxide film so that the electrode pads for the movable and the fixed electrodes are formed on the second semiconductor layer 3.

Then, a photo-resist layer is formed on the surface of the second semiconductor layer 3, the surface having the electrode pads for the movable and the fixed electrodes. The photo-resist layer is made of photosensitive resin, and has a predetermined pattern as a mask, which is formed by a photolithography method. Then, the second semiconductor layer 3 is dry-etched with the photo-resist mask. Specifically, the dry-etching is performed from the surface of the second semiconductor layer 3 to the surface of the insulation layer 4 on the second semiconductor layer side. Thus, a clearance is formed between the movable portion 10 and the fixed portions 20, 30, respectively. The clearance reaches the insulation layer 4 so that the groove 40 having a predetermined depth is formed on the movable electrodes 11, 12. Here, this dry-etching is, for example, performed by a method disclosed in Japanese Patent Application Publication No. H14-176182.

The groove 40 has the following characteristics. As shown in FIG. 1A, the groove 40 has a width in the longitudinal direction of the movable electrode 11, 12, i.e., the Y direction, and the width of the groove 40 is narrower than the clearance between the movable portion 10 and the fixed portion 20, 30. In this case, a part of the photo resist mask corresponding to the groove 40 is removed and opened in accordance with the shape of the groove 40. Here, when the clearance between the movable portion 10 and the fixed portion 20, 30 is etched to the surface of the insulation layer 4, the part of the second semiconductor layer 3 corresponding to the groove 40 is etched in the middle of the second semiconductor layer 3. Specifically, when the clearance having a wide width reaches the surface of the insulation layer 4 so that the clearance is completed, an etching top of the part of the second semiconductor layer 3 corresponding to the groove 40 (i.e., the bottom of the groove 40) is disposed in the middle of the second semiconductor layer 3 so that the groove 40 is formed. Accordingly, as shown in FIG. 1C, the groove 40 is formed in such a manner that the groove 40 has a predetermined depth from the surface of the movable electrode 11, 12 and the groove 40 extends from the detection surface of the movable electrode 11, 12 to the opposite surface of the movable electrode 11, 12 in the Y direction. In this method, the groove 40 is easily formed by an conventional manufacturing process with using the photo resist mask having a predetermined pattern corresponding to the groove 40.

Figure 2A:
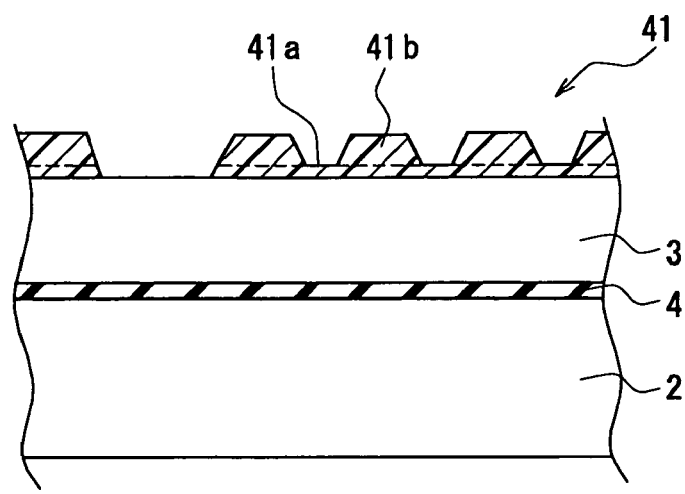
FIGS. 2A and 2B are cross sectional views explaining two different manufacturing methods of a groove in the sensor, according to the first embodiment.

The groove 40 can be formed by another method with the photo resist mask having different thicknesses. For example, when the photo resist mask is formed on the second semiconductor layer 3, the coating of the photo resist and the exposure of a light on the photo resist are performed twice. As shown in FIG. 2A, a photo resist mask 41 includes the first layer 41a and the second layer 41b. The first layer 41a has no opening portion corresponding to a groove-to-be-formed region, and the second layer 41b has an opening portion corresponding to the groove-to-be-formed region. Here, each of the first and second layers 41a, 41b has another opening portion corresponding to a clearance-to-be-formed region disposed between a movable-portion-to-be-formed region and a fixed-portion-to-be-formed region.

When the second semiconductor layer 3 is etched with the photo resist mask 41, firstly, the clearance-to-be-formed region disposed in the second semiconductor layer 3 is etched, since the first and second layers 41a, 41b are opened at the clearance-to-be-formed region. At that time, the first layer 41a disposed at the groove-to-be-formed region is etched gradually as the etching is continued. Thus, the mask 41 becomes thinner so that the first layer 41a disposed at the groove-to-be-formed region is removed. This is because the film thickness of the first layer 41a at the groove-to-be-formed region is thinner than the film thickness of both of the first and second layers disposed on other portions except for the groove-to-be-formed region. Therefore, a part of the second semiconductor layer 3 disposed at the groove-to-be-formed region is exposed.

When the film thickness of the first layer 41a is thin, the first layer 41a is removed completely before the etching top at the clearance-to-be-formed region reaches the insulation layer 4. Specifically, before the clearance is completed, the part of the second semiconductor layer 3 at the groove-to-be-formed region is exposed. Then, the etching is continued with the second layer 41b as the photo resist mask 41. Thus, the clearance is completed, and the groove 41 having a predetermined depth is formed.

When the film thickness of the first layer 41a is thick, the etching top at the clearance-to-be-formed region reaches the insulation layer 4 before the first layer 41a at the groove-to-be-formed region is removed completely. Specifically, before the part of the second semiconductor layer 3 at the groove-to-be-formed region is exposed, the clearance is completed. Then, the etching is continued with the second layer 41b as the photo resist mask 41. Thus, the clearance is completed, and then, the first layer 41a is completely removed. After that, the groove 41 having a predetermined depth is formed.

Thus, the depth of the groove 40 can be controlled. Therefore, it is possible to form the groove 40 having a wide width wider than the clearance between the movable portion 10 and the fixed portion 20, 30.

Figure 2B:
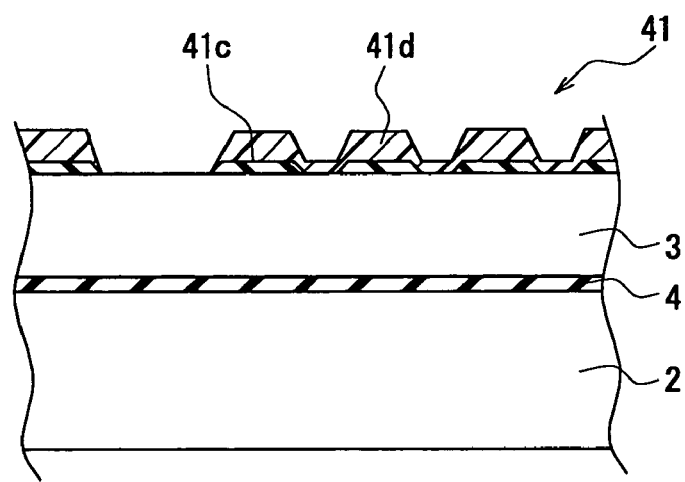

Although the photo resist mask 41 is made of photo resist, the mask 41 can be made of other materials having high etching resistance. For example, the mask 41 can be made of silicon oxide film or silicon nitride film. In these cases, dimension accuracy of the electrodes 11, 12, 21, 31 and the like is improved. Further, the mask 41 having the first and second layers 41a, 41b can be made of other material such as the silicon oxide film. In this case, for example, the mask 41 includes the first layer 41c made of silicon oxide film and the second layer 41d made of photo resist, as shown in FIG. 2B. The first layer 41c has an opening disposed at the groove-to-be-formed region. The second layer 41d has no opening disposed at the groove-to-be-formed region. Accordingly, when the clearance-to-be-formed region disposed in the second semiconductor layer 3 is etched, the second layer 41d disposed at the groove-to-be-formed region is etched gradually as the etching is continued. Then, a part of the second semiconductor layer 3 disposed at the groove-to-be-formed region is exposed.

When the film thickness of the second layer 41d is thin, the second layer 41d at the groove-to-be-formed region is removed completely before the etching top at the clearance-to-be-formed region reaches the insulation layer 4. Specifically, before the clearance is completed, the part of the second semiconductor layer 3 at the groove-to-be-formed region is exposed. Then, the etching is continued with the first layer 41c as the photo resist mask 41. Thus, the clearance is completed, and the groove 41 having a predetermined depth is formed.

When the film thickness of the second layer 41d is thick, the etching top at the clearance-to-be-formed region reaches the insulation layer 4 before the second layer 41d at the groove-to-be-formed region is removed completely. Specifically, before the part of the second semiconductor layer 3 at the groove-to-be-formed region is exposed, the clearance is completed. Here, the excess resist of the second layer 41d can be removed by a resist ashing device and the like. Then, the etching is continued with the first layer 41c as the photo resist mask 41. Thus, the clearance is completed, and then, the first layer 41a is completely removed. After that, the groove 41 having a predetermined depth is formed.

Thus, the depth of the groove 40 can be controlled. Therefore, it is possible to form the groove 40 having a wide width wider than the clearance between the movable portion 10 and the fixed portion 20, 30.

When an excess resist of the mask 41 remains at the groove-to-be-formed region after the part of the second semiconductor layer 3 is etched so that the clearance is completed, the excess resist can be removed by the resist ashing device and the like. Further, a silicon oxide film or a silicon nitride film having a predetermined pattern is formed on the backside surface of the first semiconductor layer 2. A part of the first semiconductor layer 2 is etched with an alkaline solution such as TMAH etchant (i.e., tetra methyl ammonium hydroxide etchant). Specifically, the part is anisotropically etched with using the silicon oxide film as a mask formed on the backside, so that the etching top reaches the surface of the insulation layer 4 on the first semiconductor layer side. Successively, the insulation layer 4 is removed by HF solution (i.e., hydrofluoric acid etchant), and further, the silicon oxide films disposed on the first and second semiconductor layers 2, 3 are removed by the HF solution, respectively. Thus, the sensor 1 is completed.

In general, in a conventional sensor, the length of the detection surface of each of the movable electrode 11, 12 and the fixed electrode 21, 31 is longer than the distance between the detection surfaces of the movable and the fixed electrodes 11, 12, 21, 3. Here, the length of the detection surface is along with the Y direction. Therefore, the movable portion 10 is displaced in the X direction, which is perpendicular to the detection surfaces of the movable and the fixed electrodes 11, 12, 21, 31, so that the capacitances CS1, CS2 are changed larger in accordance with a predetermined displacement. However, in this case, damping effect works in a squeezing direction (i.e., the X direction as a displacement direction of the movable portion 10) between the detection surfaces of the movable electrode 11, 12 and the fixed electrode 21, 31. The damping effect is caused by viscosity of fluid (i.e., gas, liquid or the like) disposed between the detection surfaces. As the distance between the detection surfaces becomes shorter, the damping effect affects largely in accordance with the displacement of the movable portion 10 (i.e., the movable electrode 11, 12). Accordingly, the displacement of the movable electrode becomes small because of the damping effect, so that sensitivity of the conventional sensor is reduced, i.e., the conventional sensor cannot detect fine physical quantity.

In the sensor 1 according to the first embodiment, the groove 40 is disposed on at least a part of the movable electrode 11, 12 and/or the fixed electrode 21, 31. Here, although the sensor 1 includes the groove 40 disposed on the movable electrode 11, 12, the groove 40 can be formed on the fixed electrode 21, 31. The groove 40 has a predetermined depth from the surface of the movable electrode 11, 12, and extends from the detection surface of the movable electrode 11, 12 to the opposite surface of the movable electrode 11, 12 in the X direction. Accordingly, when the movable electrode 11, 12 is displaced in accordance with application of the acceleration to the sensor 1, the fluid disposed between the movable electrode 11, 12 and the fixed electrode 21, 31 flows in and out of the clearance between the movable and the fixed electrodes 11, 12, 21, 31 through the groove 40. Thus, the damping effect is reduced, so that the displacement of the movable electrode 11, 12 is not reduced. Therefore, the distance between the detection surfaces can be shortened. Thus, even when the distance between the detection surfaces is short, the damping effect is substantially prevented from affecting because of the groove 40 so that the electro-static capacitance change becomes larger compared with the conventional sensor. Therefore, the sensor 1 can detect the fine acceleration, i.e., the sensor 1 has high sensitivity. Thus, the sensor has a small damping effect.

Further, the groove 40 can be formed by a conventional manufacturing method without adding an additional manufacturing process. Thus, the manufacturing cost for forming the groove 40 is not increased substantially.

Figure 3:
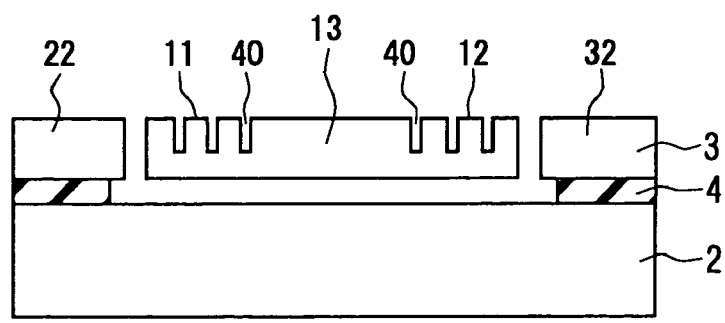
FIG. 3 is a cross sectional view showing another sensor according to a modification of the first embodiment.

Although the sensor 1 has the above-described construction, the sensor 1 can have another construction as long as the sensor 1 detects the acceleration on the basis of the capacitance change between the detection surfaces in accordance with the distance change, which is generated by the displacement of the movable electrode. For example, as shown in FIG. 3, the sensor 1 formed by processing from the surface of the second semiconductor layer 3 can also have the above construction. In this case, the first semiconductor layer 2, which is disposed under the movable electrodes 11, 12 and the fixed electrodes 21, 31, is not removed, so that the fluid between the movable and the fixed electrodes 11, 12, 21, 31 is prevented from flowing in and out of the bottom of the sensor 1. Specifically, in the sensor shown in FIG. 3, the fluid does not pass through the sensor 1 from the surface of the second semiconductor layer 3 to the bottom of the first semiconductor layer 2 through a through hole formed in the first semiconductor layer 2. However, the groove 40 is disposed at least a part of the movable electrode 11, 12 and/or the fixed electrode 21, 31 so that the damping effect is reduced. Although the groove 40 is formed on the movable electrodes 11, 12 only, the groove 40 can be formed on the fixed electrodes 21, 31 only. Further, the groove 40 can be formed on both of the movable and the fixed electrodes 11, 12, 21, 31.

Figure 4:
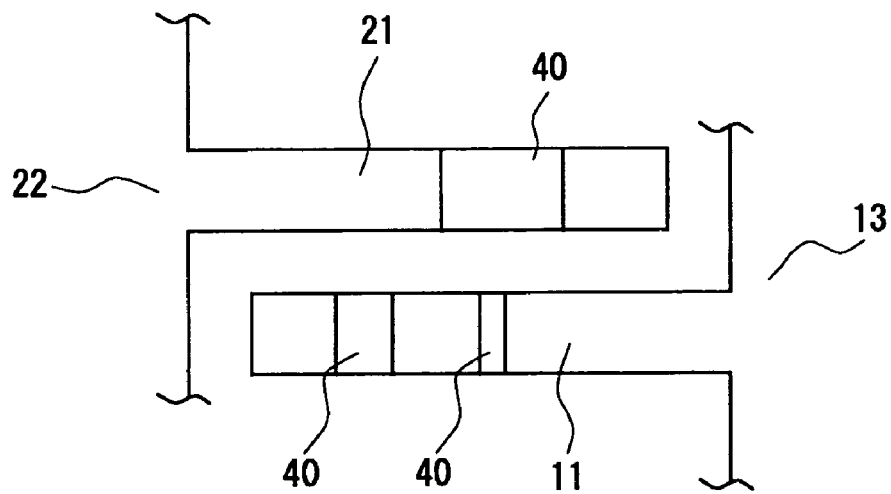
FIG. 4 is a partially enlarged plan view showing another groove according to another modification of the first embodiment.

Although the groove 40 has the depth and the width shown in FIG. 1A, the groove 40 can have other depth and width, which are different from those shown in FIG. 1A. For example, as shown in FIG. 4, the groove 40 includes multiple grooves disposed on the movable electrode 11, 12 and fixed electrode 21, 31, each width of which is different from each other. For example, two grooves 40 are formed on one electrode tooth of the movable electrode 11, as shown in FIG. 4, and each groove 40 has different width in the Y direction. Although the groove 40 in the sensor 1 in FIG. 1A has the width, which is narrower than the distance between the detection surfaces, the groove 40 can have the width, which is wider than the distance between the detection surfaces. In this case, if the width of the groove 40 becomes much wider, the facing area between the detection surfaces becomes small so that the sensitivity of the sensor 1 is reduced. Therefore, there is a desirable width of the groove 40.

Figure 5:
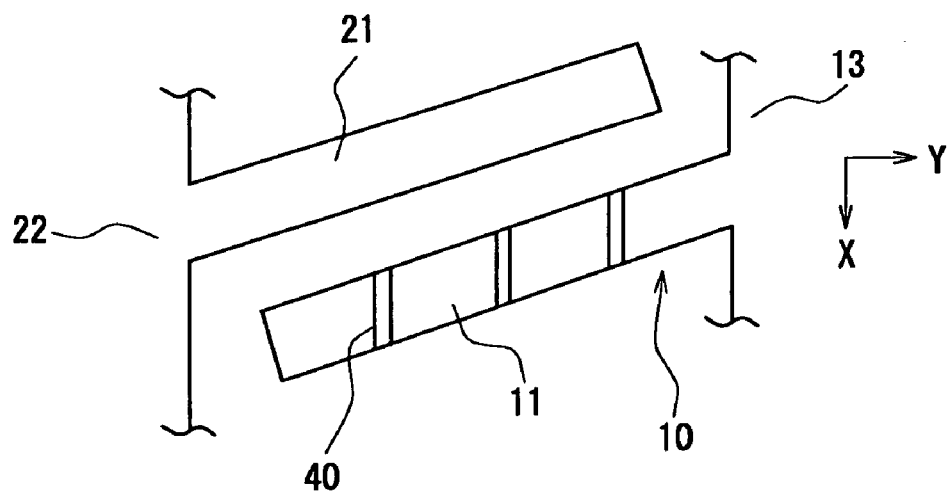
FIG. 5 is a partially enlarged plan view showing further another groove according to further another modification of the first embodiment.

Although the groove 40 penetrates the movable electrode 11, 12 in the X direction shown in FIG. 1A, the groove 40 can penetrate the movable electrode 11, 12 in another direction. However, when the groove 40 penetrates the movable electrode 11, 12 in almost the same direction as the displacement direction of the movable portion 10, the fluid disposed between the fixed electrode 21, 31 and the movable electrode 11, 12 to be displaced flows in and out through the groove 40 effectively. For example, as shown in FIG. 5, the movable electrode 11 and the fixed electrode 21 extend from the massive portion 13 and the second anchor 22, respectively, in a predetermined direction having a certain angle between the longitudinal direction of the massive portion 13 or the second anchor 22 and the fixed electrode 21 or the movable electrode 11. In this case, the penetration direction of the groove 40 is equal to the displacement direction of the movable portion 10 (i.e., the X direction). Therefore, the fluid disposed between the movable electrode 11 to be displaced and the fixed electrode 21 disposed on the movable electrode side, the movable electrode 11 being displaced, flows in and out through the groove 40 effectively. Thus, the damping effect is reduced, so that the displacement of the movable electrode 11 is not reduced.

Figure 6A:
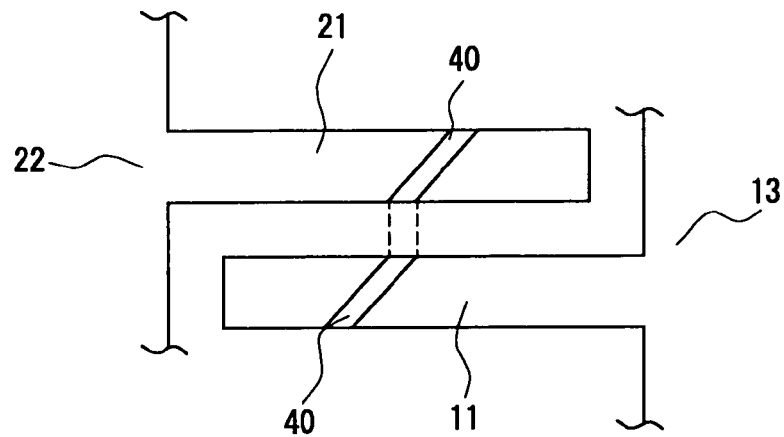
FIGS. 6A–6C are partially enlarged plan views explaining furthermore another groove according to furthermore another modification of the first embodiment.
Figure 6B:
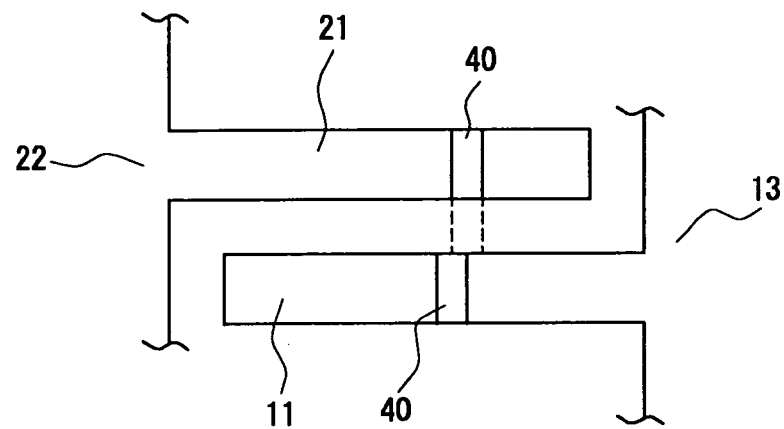
Figure 6C:
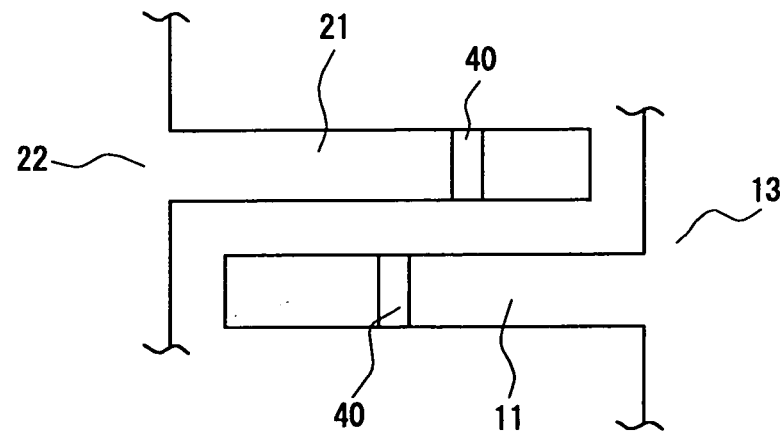

Further, the groove 40 can be disposed on any part of the movable and/or the fixed electrode 11, 12, 21, 31. However, it is preferred that the groove 40 disposed on the movable electrode 11, 12 is not aligned with the groove 40 disposed on the fixed electrode 21, 31 in the displacement direction of the movable portion 10. This is because the fluid can flow in and out through the groove 40 effectively in the sensor 1 having a small cross section of the groove 40. Specifically, the fluid flows in and out through the groove 40 disposed in a wide area between the detection surfaces as wide as possible. Here, the arrangement of being aligned in a line is, for example, shown in FIG. 6A. The groove 40 on the movable electrode 11 has an opening width in the Y direction, the width being equal to that on the fixed electrode 21, and the opening disposed on the detection surface of the movable electrode 11 coincides with the opening disposed on the detection surface of the fixed electrode 21. Specifically, the opening of the groove 40 on the movable electrode 11 is aligned with the opening of the groove 40 on the fixed electrode 21. Therefore, as shown in FIGS. 4, 6B and 6C, when the opening of the groove 40 on the movable electrode 11 is not completely aligned with the opening of the groove 40 on the fixed electrode 21, the opening does not coincide with the opening of the groove on the fixed electrode 21. In this case, as shown in FIG. 6C, preferably, the groove 40 on the movable electrode 11 is disposed apart from the groove 40 on the fixed electrode 21 at a predetermined distance.

Further, the groove 40 has a predetermined depth from the surface of the movable electrode 11, 12. However, the groove 40 can be formed on the bottom of the movable electrodes 11, 12 and/or the fixed electrode 21, 31 with a predetermined depth. The bottoms of the movable and the fixed electrodes 11, 12, 21, 31 are parts of the bottom of the second semiconductor layer 3. Specifically, in this case, the groove 40 is formed from the bottom of the movable and/or the fixed electrodes 11, 12, 21, 31.

(Second Embodiment)

Figure 7:
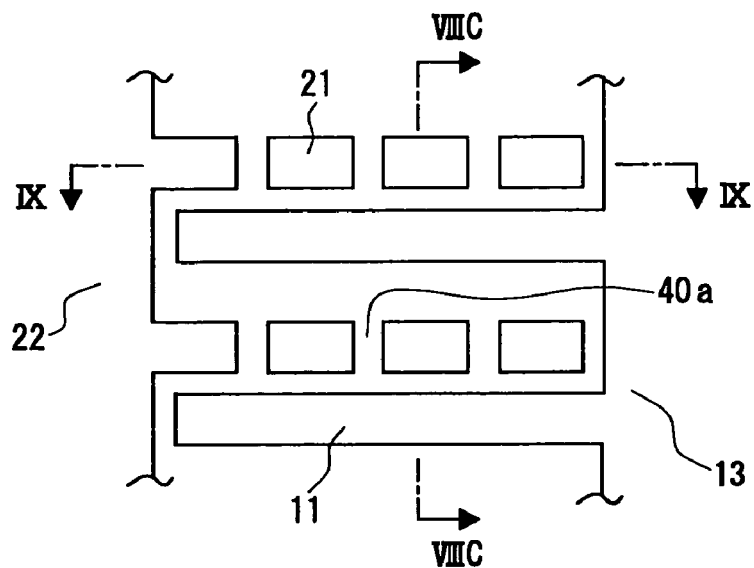
FIG. 7 is a partially enlarged plan view showing the first sensing portion of a capacitance type acceleration sensor according to a second embodiment of the present invention.

A capacitance type acceleration sensor 1 according to a second embodiment of the present invention is shown in FIGS. 7 and 8. FIG. 7 is an enlarged plan view showing the first sensing portion 50. A groove 40a of the fixed electrode 21 is disposed from the top of the fixed electrode 21 to the bottom of the fixed electrode 21 so that the fixed electrode 21 is divided into multiple parts by the groove 40a. Specifically, the groove 40a of the fixed electrode 21 penetrates through the fixed electrode 21 from the detection surface to the opposite surface, and further, penetrates the fixed electrode in the thickness direction from the top to the bottom. Therefore, the fixed electrode 21 is divided into four parts completely, as shown in FIG. 7. Although the fixed electrode 21 is divided into four parts, the fixed electrode 21 can be divided into multiple parts such as three or five parts.

Figure 8A:
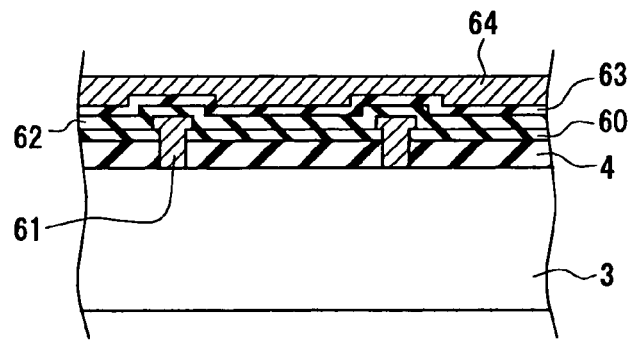
FIGS. 8A–8C are cross sectional views explaining a method for manufacturing the sensor according to the second embodiment.

The sensor 1 according to the second embodiment is manufactured as follows with reference to the drawings of FIG. 8A–8C. Here, FIG. 8C is a cross sectional view showing the sensor 1 taken along line VIIIC—VIIIC in FIG. 7. The manufacturing method is a conventional semiconductor device method disclosed, for example, in Japanese Patent Application Publication No. H12-022171.

At first, the insulation layer 4 is formed on the surface of the second semiconductor layer 3. The insulation layer 4 is made of silicon oxide film by a CVD (i.e., chemical vapor deposition) method. Then, a silicon nitride film 60 is formed on the insulation layer 4. The silicon nitride film 60 works as a stopper for stopping to etch the insulation layer 4. An opening is formed on the insulation layer 4 and the silicon nitride film 60 by the photo-lithography method and the dry-etching method. The opening corresponds to the multiple parts of the fixed electrode 21.

Then, a poly silicon film is formed on the silicon nitride film 60 with the opening by the CVD method. At that time, an impurity is introduced in the poly silicon film so that the poly silicon film becomes conductive (i.e., becomes a conductive film). The poly silicon film is patterned by the photo-lithography method so that a wiring layer 61 is formed in the opening of the silicon nitride film 60. The wiring layer 61 is disposed at a predetermined position on the second semiconductor layer 3. Then, a protection film 62 made of a silicon nitride film is formed on the silicon nitride film 60 with the wiring layer 61. The protection film 62 protects the wiring layer 61.

Next, a silicon oxide film 63 is formed on the protection film 62, and further, a poly silicon film 64 is formed on the silicon oxide film 63. The poly silicon film 64 works as an adhesion for bonding the second semiconductor layer 3 and the first semiconductor layer 2. The surface of the poly silicon film 64 is flattened by a mechanical polishing method and the like in order to bond the first and second semiconductor layers 2, 3 strongly.

Figure 8B:
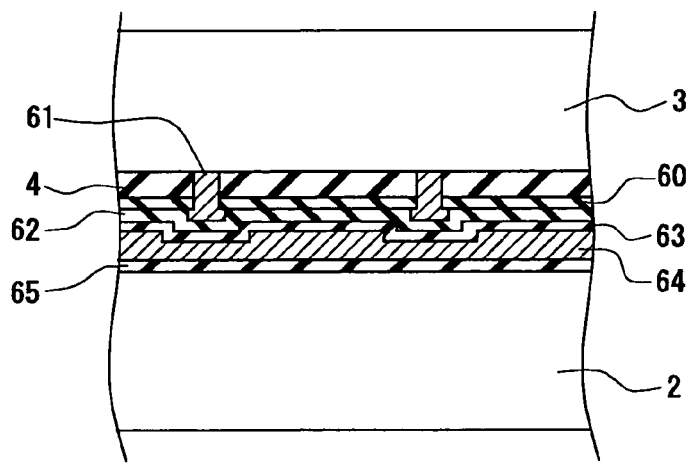
Figure 8C:
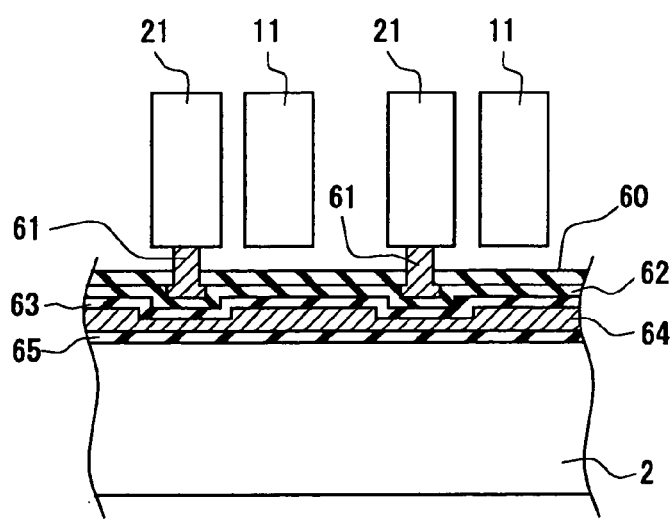

As shown in FIG. 8B, the first semiconductor layer 2 as a semiconductor substrate is prepared. Another silicon oxide film 65 is formed on the surface of the first semiconductor layer 2 by a thermal oxidation method and the like. After that, the other silicon oxide film 65 on the first semiconductor layer 2 is bonded to the poly silicon film 64 on the second semiconductor layer 3 by an anode bonding method.

Then, the surface of the second semiconductor layer 3 (i.e., the top of the second semiconductor layer 3 in FIG. 8B) is polished by the mechanical polishing method and the like so that the thickness of the second semiconductor layer 3 becomes a predetermined thickness. Then, an impurity such as phosphorous (i.e., P) is doped on the second semiconductor layer 3 by a diffusion method and the like. An electrode pad (not shown) for the movable electrode 11, 12 and another electrode pad (not shown) for the fixed electrode 21, 31 are formed on the second semiconductor layer 3.

Then, a mask for etching is formed on the surface of the second semiconductor layer 3, and the second semiconductor layer 3 is etched so that the clearance between the movable portion 10 and the fixed portions 20, 30 and the groove 40a are formed. At that time, a part of the mask, which corresponds to the groove-to-be-formed region, is opened, so that the second semiconductor layer 3 is etched until the surface of the insulation layer 4 on the second semiconductor layer side is exposed. The mask is made of photo resist, silicon oxide film, silicon nitride film or the like. In this embodiment, the mask is made of silicon oxide film, which has an excellent resistance against etching.

Figure 9:
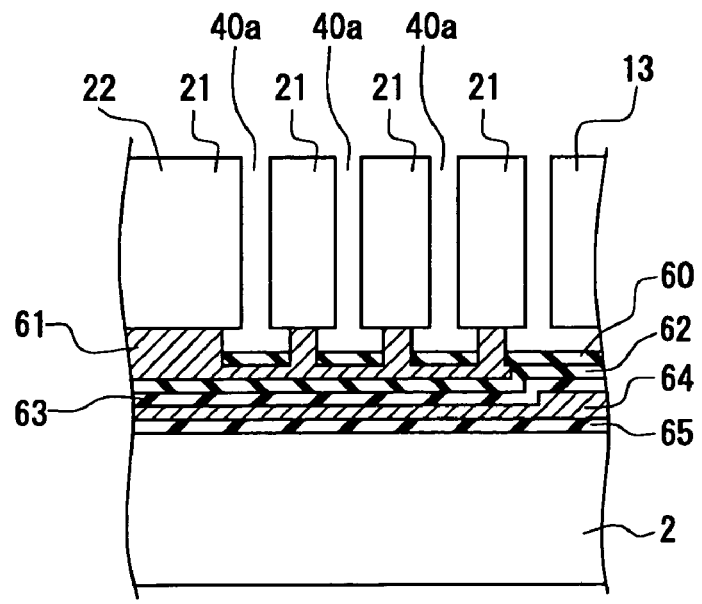
FIG. 9 is a cross sectional view showing the sensor taken along line IX—IX in FIG. 7.

Then, the insulation layer 4 is selectively removed by the HF solution, and the silicon oxide film mask on the second semiconductor layer 3 is also removed. Thus, the sensor 1 shown in FIGS. 8C and 9 is completed. The wiring layer 61 is made of poly silicon. The wiring layer 61 is partially embedded in the insulation films, i.e., the silicon nitride film 60 and the protection film 62 on the semiconductor substrate 2. However, the wiring layer 61 can be made of other materials as long as the wiring layer 61 has excellent conductivity and the insulation layer 4 is selectively etched without etching the wiring layer 61.

In the sensor 1 shown in FIGS. 7, 8C and 9, the fixed electrode 21 is divided into multiple parts by the groove 40a. Each part of the fixed electrode 21 is electrically connected together with the wiring layer 61 made of poly silicon. The wiring layer 61 is embedded in the insulation film on the first semiconductor layer 2. Further, each part of the fixed electrode 21 is supported on the first semiconductor layer 2 through the wiring layer 61. Thus, the wiring layer 61 disposed on the first semiconductor layer 2 provides a construction such that the fixed electrode 21 is divided by the groove 40a. The fixed electrode 21 is not displaced in accordance with the displacement of the movable portion 10. Therefore, the depth of the groove 40a is deeper than that of the groove 40 shown in FIG. 1A, so that the fluid much smoothly flows through the groove 40a so that the damping effect between the movable electrode 21 and the fixed electrode 21 is much reduced.

Further, in a case where the groove 40 in FIGS. 1A and 1B is formed such that the etching is stopped in the middle of the second semiconductor layer 3, processing deviation for forming the groove 40 may be caused. However, in this embodiment, the groove 40a is formed such that the groove 40 extends from the top to the bottom of the second semiconductor layer 3 by etching. Therefore, the processing deviation for forming the groove 40a is reduced.

Although only the groove 40*a* is disposed on the fixed electrode 21, the groove 40 shown in FIG. 1B can be formed on at least one part of the movable electrodes 11, 12 and/or the fixed electrodes 21, 31.

Preferably, each part of the fixed electrode 21 has at least one connection area for connecting to the wiring layer 61. The connection area is smaller than the bottom of the part of the fixed electrode 21. In this case, a clearance is formed between the bottom of the part of the fixed electrode 21 and the first semiconductor layer 2 as the semiconductor substrate. Specifically, the part of the fixed electrode 21 connects to the wiring layer 61 at the connection area, which has a width narrower than the width of the bottom of the part of the fixed electrode 21 in the latitudinal direction of the fixed electrode 21 (i.e., the X direction), as shown in FIG. 8C. Accordingly, the fluid also flows through the clearance under the part of the fixed electrode 21, so that the damping effect is much reduced. However, the part of the fixed electrode 21 can be connected to the wiring layer 61 with a whole area of the bottom of the part, i.e., the top of the wiring layer 61 coincides with the bottom of the part of the fixed electrode 21.

Further, it is preferred that another clearance is formed between the bottom of the part of the fixed electrode 21 and the first semiconductor layer 2. The other clearance is disposed from the detection surface to the opposite surface of the fixed electrode 21. Specifically, the part of the fixed electrode 21 connects to the wiring layer 61 at the connection area, which has a width narrower than the width of the bottom of the part of the fixed electrode 21 in the longitudinal direction of the fixed electrode 21 (i.e., the Y direction), as shown in FIG. 9. Accordingly, the fluid also flows through the clearance under the part of the fixed electrode 21 from the detection surface to the opposite surface of the fixed electrode 21, so that the damping effect is much reduced. Thus, as a flowing path for flowing the fluid becomes wider, the damping effect is much reduced. Therefore, the connection area between the part of the fixed electrode 21 and the wiring layer 61 becomes smaller as much as possible as long as the connection between the fixed electrode 21 and the wiring layer 61 has sufficient strength. Therefore, it is preferred that the connection between the fixed electrode 21 and the wiring layer 61 is provided by one portion, and the connection area becomes small (i.e., each width of the connection area in the X and Y directions becomes narrower).

Figure 10:
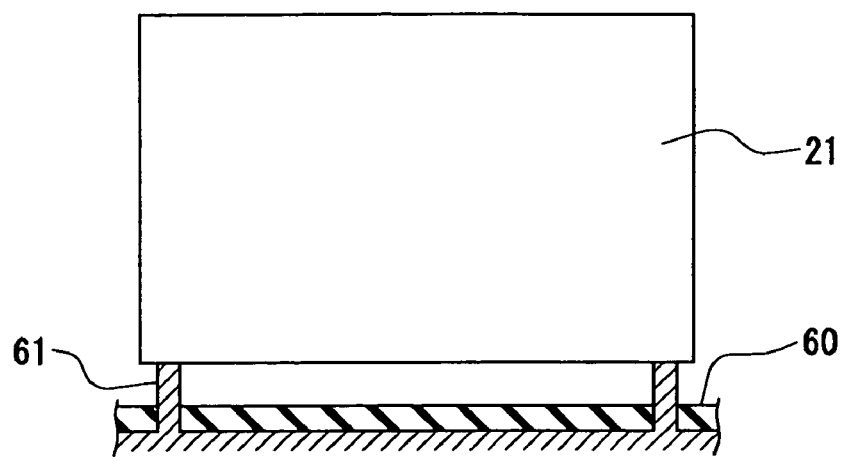
FIG. 10 is a cross sectional view showing a wiring layer of the sensor according to a modification of the second embodiment.

When the part of the fixed electrode 21 has a large bottom, as shown in FIG. 10, it is preferred that the part of the fixed electrode 21 has multiple connections. For example, as shown in FIG. 10, two connection portions of the part of the fixed electrode 21 are provided. This is because the connection between the fixed electrode 21 and the wiring layer 61 becomes weak if the part of the fixed electrode 21 has one connection portion having small connection area. Further, if the part of the fixed electrode 21 has one connection portion having large connection area, the fluid is prevented from flowing through the clearance sufficiently. Therefore, the part of the fixed electrode 21 has multiple connection portions having a small connection area, so that the fluid flows through the clearance smoothly. In this case, preferably, the clearance as a passage for flowing the fluid becomes wider as much as possible as long as the part of the fixed electrode 21 is supported on the wiring layer 61 stably. Further, the connection portions are disposed on predetermined positions, respectively, so that the fluid flows smoothly and the part of the fixed electrode 21 is supported stably.

Figure 11:
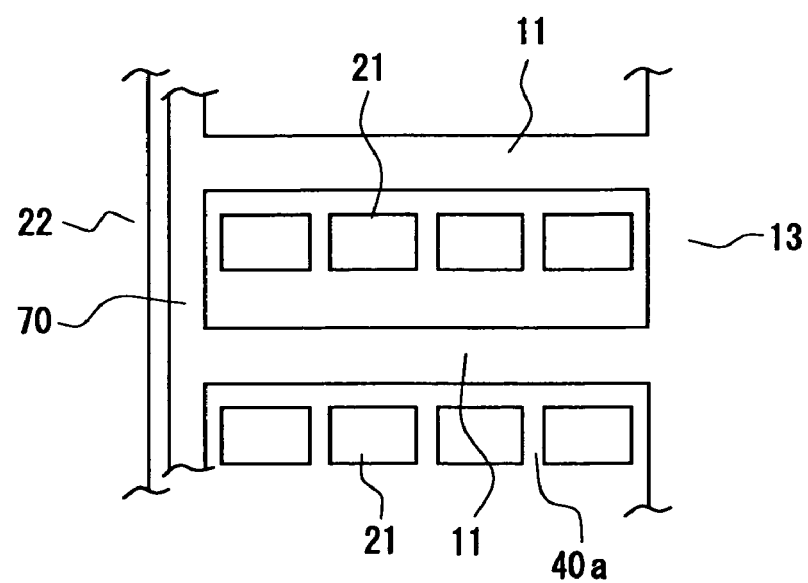
FIG. 11 is a partially enlarged plan view showing the first sensing portion of the sensor according to another modification of the second embodiment.

Further, in a case where the movable electrode 11 includes multiple electrode teeth, the multiple electrode teeth can be connected with a connecting portion 70, as shown in FIG. 11. The connecting portion 70 is formed in such a manner that a mask having a movable-electrode-to-be-formed region and a connecting-portion-to-be-formed region is prepared, and then the second semiconductor layer 3 is etched so that the connecting portion 70 is formed integrally together with the electrode teeth of the movable electrode 11. The connecting portion 70 can be formed in the second sensing portion 51. In this case, since the connecting portion 70 connects between the electrode teeth of the movable electrode 11, the movable electrode 11 has high rigidity. Therefore, a sticking (i.e., an adhesion) between, for example, the fixed electrode 21 and the movable electrode 11 is reduced. Here, the sticking may be caused by the surface tension of an etchant in a wet-etching process for manufacturing the sensor 1. Specifically, the sticking may be caused in the etching process for etching the second semiconductor layer 3. Further, the sticking may be caused by an electro-static force occurred in an assembling process of the sensor 1 or in use. Although the connecting portion 70 is disposed on a predetermined position shown in FIG. 10, the connecting portion 70 can be disposed on other positions. Further, the connecting portion 70 can have multiple connecting portions.

Although the sensor 1 is used for the capacitance type acceleration sensor 1, the sensor 1 can be used for a capacitance type yaw-rate sensor, a capacitance type angular velocity sensor or the like.

Such changes and modifications are to be understood as being within the scope of the present invention as defined by the appended claims.

What is claimed is:

1. A capacitance type physical quantity sensor for detecting physical quantity, the sensor comprising:
 a movable portion including a movable electrode;
 a fixed portion including a fixed electrode; and
 a substrate,
 wherein the movable electrode includes a detection surface,
 wherein the fixed electrode includes a detection surface facing the detection surface of the movable electrode,
 wherein the movable electrode is movable toward or against the fixed electrode in accordance with the physical quantity applied to the sensor so that a distance between the detection surfaces of the movable and the fixed electrodes is changeable,
 wherein at least one of the movable and the fixed electrodes includes a groove,
 wherein the groove is disposed on a top or a bottom of the one of the movable and the fixed electrodes, has a predetermined depth from the top or the bottom, and extends across from the detection surface of the electrode to an opposite detection surface of the same electrode so that a direction that the groove extends is parallel to a movable direction of the movable electrode,
 wherein the movable portion further includes a spring and a massive portion,
 wherein the fixed portion further includes an anchor,
 wherein the movable portion is supported on the substrate through the spring,
 wherein the massive portion together with the movable electrode is displaceable in accordance with the physical quantity applied to the sensor, wherein the movable electrode is integrally disposed on a side of the massive portion to extend from the massive portion, wherein the fixed electrode extends from the anchor so that the fixed electrode is supported on the substrate through the anchor, wherein the detection surface of one or more of the movable electrode and the fixed electrode is perpendicular to the movable direction, and wherein the sensor detects the physical quantity on the basis of a change of a capacitance provided by a capacitor between the detection surfaces of the movable and the fixed electrodes, the change of the capacitance caused by a displacement of the movable electrode in accordance with the physical quantity applied to the massive portion.

2. The sensor according to claim 1, wherein the groove works as a flow path for flowing a fluid disposed between the movable and the fixed portions in a case where the movable portion moves toward or against the fixed electrode.

3. The sensor according to claim 1, wherein the movable portion is displaceable in a direction perpendicular to the detection surfaces of the movable and the fixed electrodes.

4. The sensor according to claim 1, wherein the movable portion has a displaceable direction, in which the movable portion is displaceable, wherein the groove has a penetration direction, in which the groove penetrates the one of the movable and the fixed electrodes, and wherein the displaceable direction is parallel to the penetration direction.

5. The sensor according to claim 1, wherein the movable portion has a displaceable direction, in which the movable portion is displaceable, wherein the groove is disposed on both of the movable and the fixed electrodes, and wherein the groove on the movable electrode is not arranged in line with the groove on the fixed electrode in the displaceable direction.

6. The sensor according to claim 1, wherein the sensor is a capacitance type acceleration sensor, a capacitance type yaw rate sensor, a capacitance type angular speed sensor, or a capacitance type angular acceleration sensor.

7. The sensor according to claim 1, wherein the movable electrode includes a plurality of comb-tooth electrodes, wherein the fixed electrode includes a plurality of comb-tooth electrodes, and wherein each comb-tooth electrode of the movable electrode faces the comb-tooth electrode of the fixed electrode so that each of the detection surfaces of the movable and the fixed electrodes is provided.

8. The sensor according to claim 1, wherein the groove is disposed from the top to the bottom of the fixed electrode so that the fixed electrode is divided into a plurality of parts, and wherein each part of the fixed electrode is insulated from the substrate, connects each other through a wiring disposed on the substrate, and supported on the substrate through the wiring.

9. The sensor according to claim 8, wherein each part of the fixed electrode connects to the wiring at one connection portion, which has a connection area smaller than a bottom of the part of the fixed electrode.

10. The sensor according to claim 9, wherein between the bottom of the part of the fixed electrode and the substrate, a clearance is disposed, and wherein the clearance is disposed from the detection surface to the opposite surface of the fixed electrode.

11. The sensor according to claim 8, wherein the movable electrode includes a plurality of comb-tooth electrodes, wherein at least neighboring two of the comb-tooth electrodes are connected together with a connection member, and wherein the connection member is disposed in the groove of the fixed electrode.

12. The sensor according to claim 8, wherein the wiring is partially embedded in the substrate.

13. A capacitance type physical quantity sensor for detecting physical quantity, the sensor comprising:

a movable portion including a movable electrode; and a fixed portion including a fixed electrode, wherein the movable electrode includes a detection surface, wherein the fixed electrode includes a detection surface facing the detection surface of the movable electrode, wherein the movable electrode is movable toward or against the fixed electrode in accordance with the physical quantity applied to the sensor so that a distance between the detection surfaces of the movable and the fixed electrodes is changeable, wherein at least one of the movable and the fixed electrodes includes a thin portion, wherein the detection surface of one or more of the movable electrode and the fixed electrode is perpendicular to the movable direction, and wherein the thin portion extends across from the detection surface of the electrode to an opposite detection surface of the same electrode so that a direction that the thin portion extends is parallel to a movable direction of the movable electrode.

14. The sensor according to claim 13, further comprising:

a substrate, wherein the movable portion further includes a spring and a massive portion, wherein the fixed portion further includes an anchor, wherein the movable portion is supported on the substrate through the spring, wherein the massive portion together with the movable electrode is displaceable in accordance with the physical quantity applied to the sensor, wherein the movable electrode is integrally disposed on a side of the massive portion to extend from the massive portion, wherein the fixed electrode extends from the anchor so that the fixed electrode is supported on the substrate through the anchor, and wherein the sensor detects the physical quantity on the basis of a change of a capacitance provided by a capacitor between the detection surfaces of the movable and the fixed electrodes, the change of the capacitance caused by a displacement of the movable electrode in accordance with the physical quantity applied to the massive portion.

15. The sensor according to claim 14,
wherein the movable electrode includes a plurality of comb-tooth electrodes,
wherein the fixed electrode includes a plurality of comb-tooth electrodes, and
wherein each comb-tooth electrode of the movable electrode faces the comb-tooth electrode of the fixed electrode so that each of the detection surfaces of the movable and the fixed electrodes is provided.

16. The sensor according to claim 13,
wherein the thin portion works as a flow path for flowing a fluid disposed between the movable and the fixed portions in a case where the movable portion moves toward or against the fixed electrode.

17. The sensor according to claim 13,
wherein the movable portion is displaceable in a direction perpendicular to the detection surfaces of the movable and the fixed electrodes.

18. The sensor according to claim 13,
wherein the movable portion has a displaceable direction, in which the movable portion is displaceable,
wherein the thin portion has an extending direction, in which the thin portion extends on the one of the movable and the fixed electrodes, and
wherein the displaceable direction is parallel to the extending direction.

19. The sensor according to claim 13,
wherein the movable portion has a displaceable direction, in which the movable portion is displaceable,
wherein the thin portion is disposed on both of the movable and the fixed electrodes, and
wherein the thin portion on the movable electrode is not arranged in line with the thin portion on the fixed electrode in the displaceable direction.

20. The sensor according to claim 1,
wherein the groove extends on the top or the bottom of the one of the movable and the fixed electrodes from the detection surface to an opposite surface opposite to the detection surface of the one of the movable and the fixed electrodes.

21. The sensor according to claim 13,
wherein the thin portion extends on the top or the bottom of the one of the movable and the fixed electrodes from the detection surface to an opposite surface opposite to the detection surface of the one of the movable and the fixed electrodes.

* * * * *